Dec. 16, 1947.                R. C. SANDERS, JR                    2,432,939
                            RADIO NAVIGATION SYSTEM
                              Filed May 4, 1944                 2 Sheets-Sheet 1
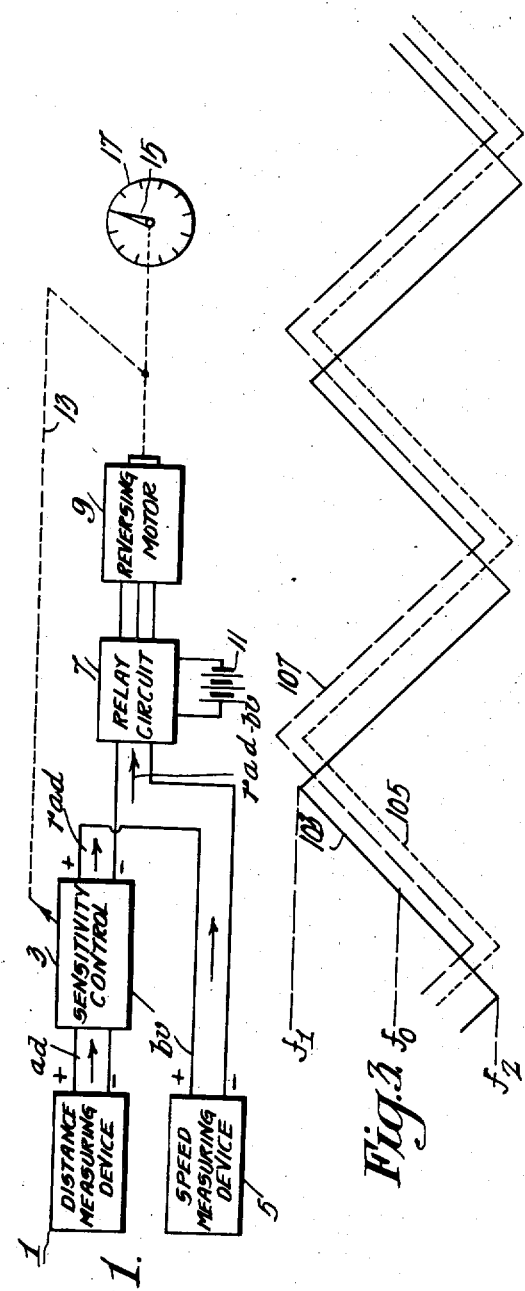
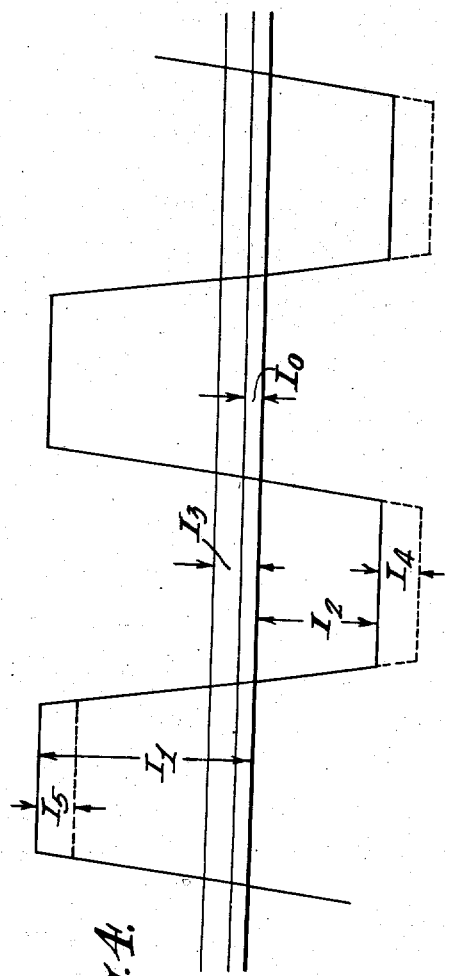
INVENTOR.
Royden C. Sanders, Jr.
BY
                ATTORNEY

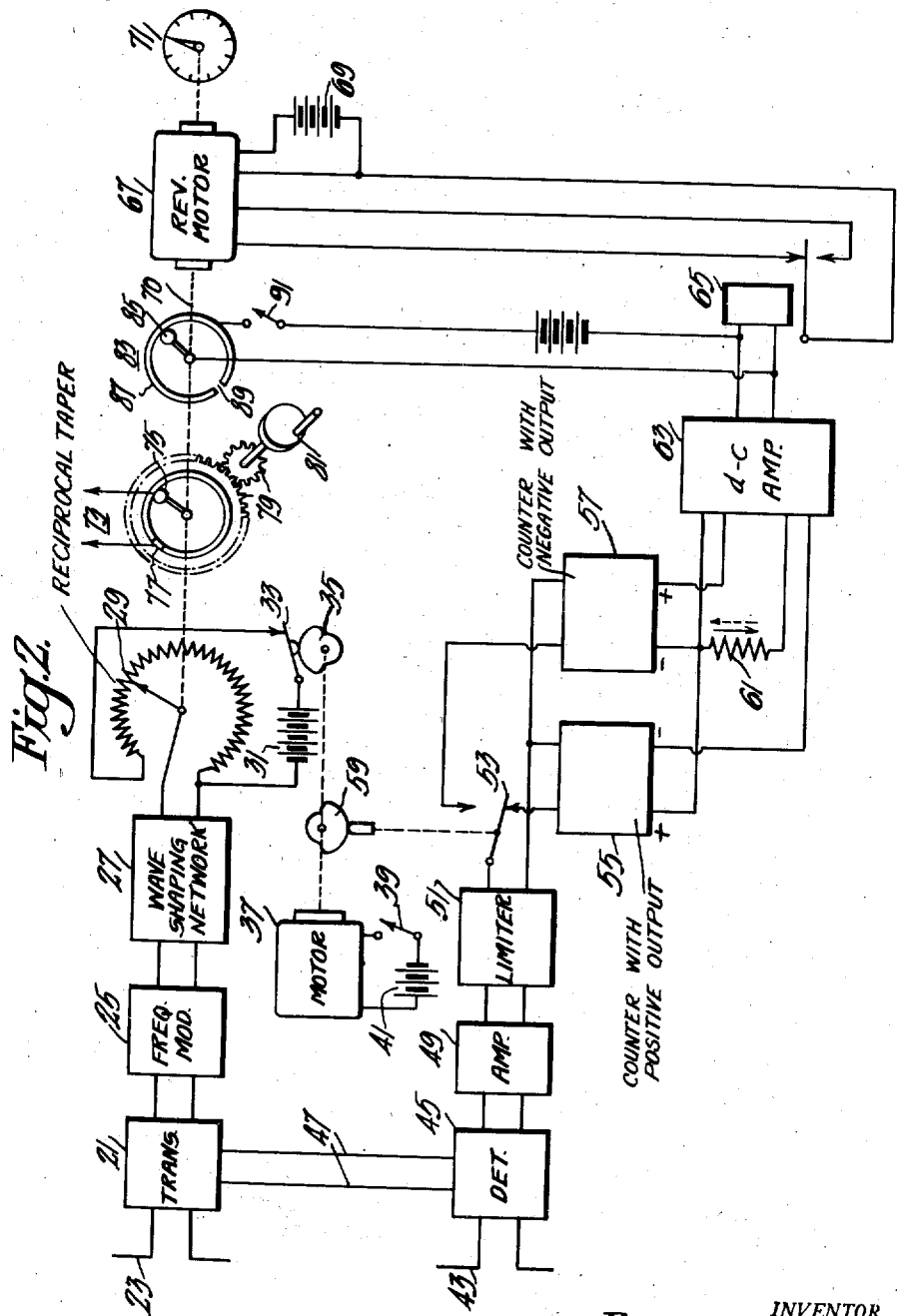

Patented Dec. 16, 1947

2,432,939

UNITED STATES PATENT OFFICE 2,432,939

RADIO NAVIGATION SYSTEM

Royden C. Sanders, Jr., Hightstown, N. J., assignor to Radio Corporation of America, a corporation of Delaware Application May 4, 1944, Serial No. 534,109

8 Claims. (Cl. 250—1.56)

1

This invention relates to radio navigation systems, and more particularly to the determination, in response to radio measurements of speed and distance, of the time which will be required for a mobile craft to reach a predetermined objective.

This information may be utilized for various purposes, by means which are not subjects of the present invention, but are exemplified by the systems disclosed in copending applications Serial Number 531,953, filed April 20, 1944, by Royden C. Sanders, Jr., and entitled Radio bomb release system, and Serial Number 537,021, filed May 23, 1944, by Royden C. Sanders, Jr., and entitled Aircraft navigation, wherein "time from target" devices of the type described and claimed herein are employed for controlling bomb release mechanisms and aircraft navigation systems.

The principal object of the present invention is to provide methods of and means for automatically computing and indicating, or providing control in response to, said "time from target," or time which will be required, under instant conditions, to arrive at a predetermined objective.

The invention will be described with reference to the accompanying drawings, of which Figure 1 is a schematic block diagram of a system embodying the invention, Figure 2 is a schematic diagram of a preferred embodiment of the invention, Figure 3 is a graphical representation of the variations in frequency of signals transmitted and received by the system of Figure 2, and Figure 4 is a graph illustrating the variations of certain current components produced in the operation of the system of Figure 2.

Referring to Figure 1, a distance measuring device 1 is arranged to provide an output voltage having a magnitude proportional to the distance of the target or objective from a craft (not shown) carrying the equipment. The device 1 may comprise radio reflection equipment, similar to that used in the well known frequency modulation type of altimeter, or any other known means for providing the required distance-proportional output. The distance measuring device 1 is provided with a sensitivity control 3, which may be merely an adjustable attenuator, or may by any other means for controlling the proportionality of the output to distance.

A speed measuring device 5, which may also be of the radio reflection type, is arranged to provide

2 an output voltage proportional to the speed of the mobile craft with respect to the objective. The output circuits of the speed and distance measuring devices 5 and 1 are connected to a relay circuit 7, in such manner that the two outputs oppose each other. The relay circuit 7 is connected to a reversible motor 9 to control the energization thereof from a power source 11. The relay circuit 7 may include electromagnetically operated contact means, electron discharge tube means, or both, in accordance with known and conventional practice. The relay circuit 7 is adjusted so that when the polarity of the input thereto is similar to that of the ouput of the distance measuring device 1, the motor 9 is energized to run clockwise, for example. When the polarity of the input to the relay circuit 7 is similar to that of the output of the speed measuring device 5, the motor 9 is energized to run counter-clockwise.

The shaft of the motor 9 is mechanically coupled, as indicated schematically by the dash line 13, to the sensitivity control 3. An indicator 15, provided with a scale 17, is similarly coupled to the motor 9. The scale 17 may be calibrated in units of time, such as seconds.

In the operation of the above-described system, the distance measuring device 1 produces an output voltage $$e_d = ad$$

where $d$ is the distance and $a$ is a constant determined by the design of the device 1. The speed measuring device 5 produces an output voltage $$e_v = bv$$

where $v$ is the velocity and $b$ is a constant determined by the design of the device 5.

The sensitivity control 3 changes the voltage $e_d$ by a factor $r$, providing a voltage $$e_d' = rad$$

where the value of $r$ is a predetermined function of the mechanical setting, or angular position of the control shaft of the sensitivity control 3.

The voltages $e_d'$ and $e_v$ are applied, in opposition to each other, to the relay circuit 7. The resultant input to the relay circuit is thus $$e_0 = rad - bv$$

As long as $e_0$ is not equal to zero, the motor 9 will be energized to drive the shaft in the proper direction to reduce the difference between the speed and distance components of the voltage $e_0$, by varying the ratio $r$. The value of $e_0$ will be substantially continuously maintained at zero by this operation, and $$rad = bv$$

Factoring and transposing:

$$\frac{d}{v} = \frac{b}{ra}$$

The quantity $$\frac{d}{v}$$

is the distance of the objective divided by the speed with respect thereto. Subject to the condition that the motion is such as to decrease, rather than increase the distance $d$, $$\frac{d}{v} = T$$

where $T$ is the time from target. Thus $$T = \frac{1}{r}k$$

where $k$ is constant and equal to $b/a$.

In order that the calibration of the scale 17 may be made linear, and the angular position of the shaft be directly, rather than inversely proportional to $T$, the control 3 may be constructed to provide a reciprocal characteristic of $r$ vs. rotation, or as an alternative, the mechanical connection 13 may include variable ratio gearing or cam means arranged in known manner to provide reciprocal variation of $r$ as a function of input shaft rotation. However, obtained, this reciprocal characteristic need only extend over the range of time $T$ required by the application of the equipment, i. e., not necessarily from $T=0$ to $T=\infty$. The indicator 15 will assume, within the limits of the operating range, an angular position which is a predetermined linear function of $T$, providing direct indication upon the scale 17. The shaft of the motor 9 may be coupled also to any other device to be controlled in accordance with the time from target, $T$.

It will be apparent that a linear relationship between $T$ and $r$ may be obtained also by controlling the response of the speed measuring device, rather than that of the distance measuring device. This arrangement is not illustrated in the drawings, since it involves merely the transfer of the control 3 from the output of the device 1 to that of the device 5. The operation of the system as thus modified is identical with the operation of the system of Figure 1.

Figure 2 illustrates a time from target system including radio speed and distance determining means of the frequency modulation type, similar to that described and claimed in copending U. S. application Serial Number 524,794, filed March 2, 1944, by R. C. Sanders, Jr., and W. R. Mercer and entitled Radio bomb release system.

A radio transmitter 21 is connected to an antenna 23 and to a frequency modulator 25. The modulator 25 may be of the vibratory variable capacitor type such as that described in copending U. S. application Serial Number 471,003, filed January 1, 1943, by S. V. Perry and entitled Capacity modulator unit, or any other known device for varying the frequency of the transmitter 21 in response to a modulating voltage. The input circuit of the modulator 25 is connected to a wave shaping network 27 which is connected through a variable voltage divider 29 to a battery 31 and a periodic switch 33. The switch 33 is arranged to be operated by a cam 35 driven by a motor 37. The motor 37 is connected through a switch 39 to a power source such as a battery 41.

A receiving antenna 43 similar in construction to the antenna 23 is connected to a detector 45. The transmitter 21 is also connected to the detector 45 through a line 47. Both antennas 23 and 43 are preferably directive, and are arranged to provide maximum response in the same direction.

The output circuit in the detector 45 is coupled through an amplifier 49 to a limiter 51. The output of the limiter 51 is applied through a double throw switch 53 to a pair of averaging cycle countercircuits 55 and 57. The switch 53 is arranged for periodic actuation by means of a cam 59 synchronously with the operation of the switch 33. Although mechanical switching of the input to the counters 55 and 57 is shown for simplicity of description, electronic switching may be employed as described in said application Serial Number 524,794.

The counters 55 and 57 are provided with a common load resistor 61 which is connected to the input circuit of a D.-C. amplifier 63. The counter 55 is connected to cause current to flow through the resistor 61 in the direction indicated by the solid arrow, while the counter 57 provides current in the opposite direction, as indicated by the dash arrow. The return circuits of the counters 55 and 57 are connected to points in the amplifier 63 such as to provide linear operation of the counters, as described in said copending application Serial Number 524,794. The cams 35 and 59 are so positioned as to connect the counter 55 to the output circuit of the limiter 51 when the switch 33 is closed. The counter 57 is connected to the limiter 51 when the switch 33 is open.

The D.-C. amplifier 63 is connected to a relay 65 provided with a double throw contact arrangement connecting a reversible motor 67 to its power source 69. The amplifier 63 is biassed so that when the output of the counter 55 exceeds that of the counter 57, the armature of the relay 65 is actuated to its upper position, connecting the motor 67 for clockwise rotation, and when the output of the counter 57 exceeds that of the counter 55, the relay armature goes to its lower position and the motor 67 rotates counter-clockwise.

The shaft 70 of the motor 67 is connected to an indicator 71, as in the system of Figure 1, and is coupled to the voltage divider 29. The shaft 70 is connected to any required time from target utilization device, for example a rotary switch 73. The switch 73 includes a rotatable contact 75 and a contact 77 which may be angularly adjusted by means of a gear connection 79 to a hand wheel 81. A reset switch 83 is also coupled to the shaft 70. The switch 83 includes a rotatable contact 85 and a stationary contact comprising a circular conductive member 87. The contact 87 is provided with a small gap 89 at an angular position corresponding to the starting point of the resistor of the voltage divider 29. The switch 83 is connected in series with a switch 91 across the winding of the relay 65.

The operation of the system of Figure 2 is as follows: The motor 37 operates the switch 33 by means of the cam 35 to connect the battery 31 periodically to the voltage divider 29, thus producing a square wave variation of the voltage across the voltage divider 29. The square wave voltage is attenuated to an extent depending upon the position of the adjustable tap of the voltage divider 29, and is applied to the wave shaping circuit 27. The wave shaping circuit 27 includes a low pass filter or other means for integrating the square wave input with respect to time to produce an output of triangular wave shape. The triangular wave output of the wave shaping circuit 27 is applied to the modulator 25, causing corresponding triangular wave variation of a frequency of operation of the transmitter 21. The frequency modulated signal produced by the transmitter 21 is radiated by the antenna 23 to the target, not shown, or to an echo station which retransmits the signal. Part of the energy striking the target is returned to the receiving antenna 43. The received return signal is combined in the detector 45 with some of the original frequency modulated signal, which is conducted directly from the transmitter 21 to the detector 45 through the line 47. The output of the detector 45 includes a beat signal having a frequency equal to the difference between the instantaneous frequencies of the transmitted and received signals. The beat output of the detector 45 is amplified by the amplifier 49 and limited to a constant amplitude by the limiter 51. The output of the limiter 51 is a square wave voltage having a frequency equal to the difference between the frequencies of the transmitted and received signals, and a constant amplitude, $E_s$.

Referring to Figure 3, the frequency of the transmitted signal is represented by the solid line 103. This frequency varies throughout the modulation cycle in response to the triangular wave output of the wave shaping circuit 27, between upper and lower limits $f_2$ and $f_1$, respectively, about a mean value $f_0$. The sweep width $f_2-f_1$ is proportional to the amplitude of the triangular input to the modulator 25, and hence is a function of the position of the adjustable contact of the voltage divider 29. The reflected signal is delayed with respect to the transmitted signal by the time required for the radiation to travel from the transmitting antenna 23 to the target, and back to the receiving antenna 43. This is indicated by the dotted line 105 in Figure 3. The reflected signal varies in frequency over the same range $f_2-f_1$ as the transmitted signal, but constantly differs in frequency from the transmitted signal by an amount proportional to the distance. This difference in frequency is $$\frac{Sf_m d}{246}$$

cycles per second, where $S=f_1-f_2$ in megacycles per second, $f_m$ is the modulation frequency in cycles per second, or frequency of operation of the switch 33 and $d$ is the distance in feet. If the equipment is moving toward the target, the received signal is increased in frequency, owing to Doppler effect, by an amount $$\frac{2vf_0}{C}$$

where $v$ is the velocity in feet per second, $f_0$ is the carrier frequency in cycles per second and C is the velocity of radiation propagation in feet per second. The frequency of the received signal is represented by the dash line 107 in Figure 3. This frequency varies throughout the modulation cycle over a frequency band which is equal in width to that of the transmitted signal.

The difference in frequency between the transmitted and the received signal is $$f_u=\frac{Sf_m d}{246}-\frac{2vf_0}{C}$$

cycles per second during increase in frequency of the transmitted signal, and $$f_d=\frac{Sf_m d}{246}+\frac{2vf_0}{C}$$

cycles per second during decrease in frequency of the transmitted signal.

The constant amplitude beat frequency output of the limiter 51 is applied to the switch 53. During the modulation upsweep, in increase in frequency of the transmitted signal, the switch 53 connects the limiter output to the positive counter 55. Thus during the modulation upsweep, the counter 55 causes a current $i_u$ to flow downward through the resistor 61 as indicated by the solid arrow. This current is proportional to the sensitivity of the counter 55 and the number of cycles per second:

$$i_u=C_1 f_u$$

where $f_u$ is the beat frequency, and $C_1$ is the sensitivity of the counter 55, in milliamperes per cycle per second. Since $$f_u=\frac{Sf_m d}{246}-\frac{2vf_0}{C}$$

$$i_u=\frac{Sf_m d}{246}C_1-\frac{2f_0 v}{C}C_1$$

During the modulation downsweep, the switch 53 connects the limiter output to the counter 57 and the counter 57 causes an average current $i_d$ to flow upward through the resistor 61 as indicated by the dash arrow. This current is proportional to the product of the sensitivity of the counter 57, and the number of cycles per second:

$$i_d=C_2 f_d$$

where $C_2$ is the sensitivity of the counter 57. In the present example, $C_2$ is less than $C_1$. Since $$f_d=\frac{Sf_m d}{246}+\frac{2vf_0}{C}$$

$$i_d=\frac{Sf_m d}{246}C_2+\frac{2f_0 v}{C}C_2$$

The average current through the resistor 61 is $$i_0=i_u-i_d$$

$$i_0=i_u-i_d=\frac{Sf_m d}{246}(C_1-C_2)-\frac{2f_0 v}{C}(C_1+C_2)$$

Refer to Figure 4, wherein $I_0$ is the average total current, $I_1$ is the average component of current during upsweep due to distance, $I_2$ is the average component of current during downsweep due to distance, $I_3$ is the resultant average component of current due to distance, $I_4$ is the increase in negative average component of current during downsweep due to speed, and $I_5$ is the decrease in positive average current during upsweep due to speed. The resultant average voltage across the resistor 61 is $$e_0=i_0 R$$

where $R$ is the resistance of the resistor 61.

The relay 65 and the amplifier are adjusted so that the motor 67 is disconnected from the battery 69, as described above, when $e_0=0$. Under this condition $$0 = i_0 R$$

and $$\frac{Sf_m d}{246}(C_1 - C_2) = \frac{2f_c v}{C}(C_1 + C_2)$$

This may be rewritten as:

$$\frac{d}{v} = \frac{2f_0(C_1 + C_2) \cdot 246}{Sf_m(C_1 - C_2) \cdot C}$$

$d/v$ is the distance to the target divided by the speed of approach to the target, and is therefore the time T which will be required to reach the target. In the present example, the quantities $f_m$, $f_0$, $C_1$ and $C_2$ remain constant, while S may be varied by means of the voltage divider 29. Accordingly $$T = \frac{k}{S}$$

where $$k = \frac{492 f_0 (C_1 + C_2)}{f_m (C_1 - C_2) C}$$

Thus it is apparent that the sweep width S is inversely proportional to the time from target T, and the position to which the voltage divider 29 must be adjusted to prevent the motor 67 from running is a measure of the time T. The value of $k$, the proportionality constant between the reciprocal of the sweep width and the time T from target, may be predetermined in accordance with practical considerations by proper choice of the constants $f_m$, $f_0$, $C_1$ and $C_2$.

The voltage divider 29 is constructed to provide a reciprocal attenuation vs. rotation characteristic, i. e., the resistance is tapered so that the sweep width S is inversely proportional, over the operating range of the equipment, to the angular position $\theta$ of the adjustable tap, as indicated on Figure 1 of the drawing. It is evident that this characteristic could not be carried out to $\theta = 0$, since infinite sweep width S would be required at this point. Similarly, the operating range is limited to a finite maximum distance, with a corresponding minimum sweep width. However, the voltage divider may be designed so that $\theta$ is proportional to $1/T$ over any selected range.

I claim as my invention:

1. The method of predicting the time which will be required for a mobile craft approaching a predetermined objective to arrive at said objective, including the steps of producing a first voltage bearing a factor of proportionality in magnitude to the distance of said objective from said craft, producing a second voltage bearing a second factor of proportionality in magnitude to the speed of said craft toward said objective, combining said first and second voltages in opposition to each other to produce a resultant voltage, controlling the magnitude of at least one of said factors in response to said resultant voltage and measuring the extent of said control in response to said resultant voltage.

2. A system for predicting the time which will be required for a mobile craft approaching a predetermined objective to arrive at said objective, including means responsive to the distance between said craft and said objective to produce a first voltage bearing a linear proportionality to said distance, means responsive to the speed of said craft toward said objective to produce a second voltage bearing a predetermined proportionality to said speed, means responsive to the difference between said first and second voltages to control the proportionality of said first voltage to said distance, and means for indicating the value of said controlled proportionality.

3. A system for predicting the time which will be required for a mobile craft approaching a predetermined objective to arrive at said objective, including means responsive to the distance between said craft and said objective to produce a first voltage bearing a predetermined proportionality to said distance, means responsive to the speed of said craft with respect to said objective to produce a second voltage bearing a proportionality to said speed, means responsive to the difference between said first and second voltages to control the proportionality of said second voltage to said speed, and means for indicating the value of said controlled proportionality.

4. The method of predicting the time which will be required for a mobile craft to arrive at a predetermined objective, including the steps of radiating a frequency modulated signal from said craft to said objective, receiving said signal after return by said objective, combining said returned signal with said transmitted signal to provide a beat signal having an average frequency proportional to the distance of said craft from said objective and a range of frequency variation proportional to the speed of said craft toward said objective, producing in response to said beat signal a voltage bearing a predetermined magnitude relationship to the difference between said average frequency of said beat signal and said range of frequency variation of said beat signal, controlling the extent of said frequency modulation of said transmitted signal in response to said voltage, and indicating the range of frequency variation of said transmitted signal.

5. A system for predicting the time which will be required for a mobile craft to arrive at a predetermined objective, including on said craft radio transmitter means, frequency modulator means connected to said radio transmitter means, radio receiver means tuned to respond to signal transmitted by said radio transmitter means and reflected by said objective, connections from said transmitter means to said receiver means to combine said transmitted signal with said received signal to provide a beat signal, two counter means connected to said receiver and separately responsive to the frequency of said beat signal during increase and during decrease in frequency of said transmitted signal, respectively, common load means connected to said counter means for differentially combining the outputs of said counter means to provide a resultant voltage, control means connected to said common load and responsive to said resultant voltage to control said frequency modulator, and switch means coupled to said control means and responsive to the extent of said control.

6. A system for predicting the time which will be required for a mobile craft approaching a predetermined objective to arrive at said objective, including means on said craft for radiating to said objective, a frequency modulated signal wherein increase in frequency and decrease in frequency each occur during a substantial interval, means on said craft for receiving said signal after reflection by said objective, means for combining said reflected signal with said transmitted signal to provide a beat signal having an average frequency proportional to the distance of said craft from said objective and a range of frequency variation proportional to the speed of approach of said craft to said objective, means responsive to said beat signal to produce a voltage bearing a predetermined magnitude relationship to the difference between the average frequency of said beat signal and the range of frequency variation of said beat signal, means responsive to the magnitude of said last-mentioned voltage for controlling the extent of said frequency modulation of said radiated signal, and means for indicating the range of frequency variation of said radiated signal.

7. A system for predicting the time which will be required for a mobile craft approaching a predetermined objective to arrive at said objective, including means on said craft for radiating a frequency modulated signal to said objective, means on said craft for receiving said signal after reflection by said objective, means for combining said reflected signal with said transmitted signal to provide a beat signal having an average frequency proportional to the distance of said craft from said objective and a range of frequency variation proportional to the speed of approach of said craft to said objective, a pair of frequency responsive counter circuits having different sensitivities, means for rendering one of said counter circuits inoperative during increase of frequency of said radiated signal, means for rendering the other of said counter circuits inoperative during decrease of frequency of said radiated signal, means responsive to the difference in the magnitudes of the average outputs of said counter circuits to control the extent of said frequency modulation of said radiated signal, and means for indicating the range of frequency variation of said transmitted signal.

8. A system for predicting the time which will be required for a mobile craft approaching a predetermined objective to arrive at said objective, including means on said craft for producing an alternating voltage having an average frequency proportional to the distance of said craft from said objective, and a range of frequency variation proportional to the speed of approach of said craft to said objective, a pair of frequency responsive counter circuits having different sensitivities, means for rendering one of said counter circuits inoperative during increase of frequency of said radiated signal, means for rendering the other of said counter circuits inoperative during decrease of frequency of said radiated signal, means responsive to the difference in the magnitudes of the average outputs of said counter circuits to control the proportionality of said average frequency to said distance, and means for indicating the value of said proportionality.

ROYDEN C. SANDERS, Jr.

REFERENCES CITED

The following references are of record in the file of this patent:

UNITED STATES PATENTS

| Number | Name | Date |
|---|---|---|
| 2,045,071 | Espenschied | June 23, 1936 |
| 2,134,716 | Gunn | Nov. 1, 1938 |
| 2,176,502 | Kurth | Oct. 17, 1939 |
| 2,306,456 | Mayne | Dec. 29, 1942 |